US006517677B1

(12) United States Patent
Cardile et al.

(10) Patent No.: US 6,517,677 B1
(45) Date of Patent: Feb. 11, 2003

(54) METHOD OF IMPROVING RETENTION AND DRAINAGE IN A PAPERMAKING PROCESS USING LOW MOLECULAR WEIGHT CATIONIC DISPERSION POLYMERS

(75) Inventors: Richard P. Cardile, Geneva, IL (US); John W. Sparapany, Bolingbrook, IL (US); Cathy C. Johnson, Geneva, IL (US); Angela P. Zagala, Naperville, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 10/035,872

(22) Filed: Jan. 4, 2002

Related U.S. Application Data

(63) Continuation-in-part of application No. 09/553,876, filed on Apr. 20, 2000, now Pat. No. 6,398,967.

(51) Int. Cl.$^7$ .............................................. D21H 21/10
(52) U.S. Cl. ................. 162/168.3; 162/181.6; 162/181.8; 162/183
(58) Field of Search ........................... 162/168.2, 168.3, 162/183, 181.6, 181.8

(56) References Cited

U.S. PATENT DOCUMENTS

| | | | |
|---|---|---|---|
| 4,929,655 A | 5/1990 | Takeda et al. | 524/458 |
| 5,006,590 A | 4/1991 | Takeda et al. | 524/458 |
| 5,597,858 A | 1/1997 | Ramesh et al. | 524/458 |
| 5,614,602 A | 3/1997 | Connors et al. | 526/307.3 |
| 5,733,462 A | 3/1998 | Mallon et al. | 210/728 |
| 5,750,034 A | 5/1998 | Wong Shing et al. | 210/705 |
| 6,007,679 A * | 12/1999 | Nagarajan et al. | 162/168.3 |
| 6,019,904 A | 2/2000 | Wong Shing et al. | 210/705 |
| 6,059,930 A * | 5/2000 | Wong Shing et al. | 162/168.2 |
| 6,071,379 A | 6/2000 | Wong Shing et al. | 162/183 |
| 6,171,505 B1 | 1/2001 | Maury et al. | |
| 6,315,866 B1 * | 11/2001 | Sanchez | 162/158 |

FOREIGN PATENT DOCUMENTS

| | | |
|---|---|---|
| CA | 2125545 A1 | 12/1994 |
| EP | 183 466 B1 | 8/1990 |
| EP | 364 175 B1 | 12/1994 |
| EP | 657 478 A2 | 6/1995 |

* cited by examiner

Primary Examiner—Peter A. Hruskoci
(74) Attorney, Agent, or Firm—Michael B. Martin; Margaret M. Brumm; Thomas M. Breininger

(57) ABSTRACT

This invention is directed to a method of improving retention and drainage performance in a papermaking process comprising adding to the furnish an effective amount of a low molecular weight water-soluble cationic dispersion polymer prepared by polymerizing one or more cationic monomers and one or more nonionic monomers and one or more chain transfer agents under free radical forming conditions in an aqueous solution of an anionic salt in the presence of a stabilizer polymer, wherein the cationic dispersion has a cationic charge of from about 10 mole percent to about 80 mole percent and an RSV of from about 0.2 dl/g to about 6 dl/g.

5 Claims, No Drawings

METHOD OF IMPROVING RETENTION AND DRAINAGE IN A PAPERMAKING PROCESS USING LOW MOLECULAR WEIGHT CATIONIC DISPERSION POLYMERS

CROSS REFERENCE TO RELATED APPLICATIONS

This is a continuation-in-part of Ser. No. 09/553,876, filed Apr. 20, 2000 now U.S. Pat. No. 6,398,967.

TECHNICAL FIELD

This invention is directed to a method of increasing retention and drainage in papermaking processes using very low molecular weight, low charge cationic dispersion polymers.

BACKGROUND OF THE INVENTION

U.S. patent application Ser. No. 09/606,581, filed Jun. 29, 2000 discloses the preparation of high molecular weight structurally-modified flocculants and their use with low molecular weight polymeric coagulants as retention and drainage aids in papermaking processes.

U.S. Pat. No. 6,313,246 discloses the preparation of high molecular weight zwitterionic flocculants and their use with low molecular weight polymeric coagulants as retention and drainage aids in papermaking processes.

U.S. Pat. No. 6,059,930 discloses the use of copolymers of (meth)acrylamide and a dialkylaminoalkyl acrylate quaternary ammonium salt, alone or in combination with one or more flocculants or coagulants as retention and drainage aids in papermaking processes.

A method of increasing retention and drainage using an anionic dispersion polymer flocculant in combination with one or more polymeric coagulants is disclosed in U.S. patent application Ser. No. 09/392,671, filed Sep. 8, 1999.

High molecular weight, high polymer actives cationic dispersion polymers for water clarification, dewatering and retention and drainage are disclosed in U.S. Pat. No. 6,171,505.

None of the foregoing references discloses the use of very low molecular weight cationic dispersion polymers as part of a retention and drainage program. Accordingly, there is a continuing need for new compositions and processes to further improve retention and drainage performance, particularly for use on the faster and bigger modem papermaking machines currently being put into use.

SUMMARY OF THE INVENTION

This invention is directed to a method for improving retention and drainage performance in a papermaking process comprising adding to a papermaking slurry an effective amount of one or more flocculants and an effective amount of one or more low molecular weight water-soluble cationic dispersion polymers, wherein the low molecular weight cationic dispersion polymer is prepared by polymerizing a) one or more cationic monomers of formula

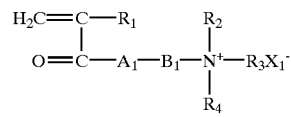

wherein $A_1$ is O or NH; $B_1$ is $C_2$–$C_4$ alkylene or hydroxypropylene; $R_1$ is H or $CH_3$, $R_2$ and R4 are independently $C_1$–$C_2$ alkyl; $R_3$ is H, $C_1$–$C_2$ alkyl or arylalkyl; and $X_1$ is an anionic counterion;

b) one or more cationic monomers of formula

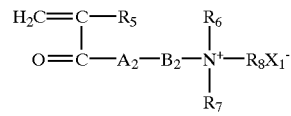

wherein $A_2$ is O or NH; $B_2$ is $C_2$–$C_4$ alkylene or hydroxypropylene; $R_5$ is H or $CH_3$, R6 and $R_7$ are independently $C_1$–$C_2$ alkyl; $R_8$ is arylalkyl; and $X_2$ is an anionic counterion;

c) one or more nonionic monomers; and d) one or more chain transfer agents, under free radical forming conditions in an aqueous solution of an anionic salt in the presence of a stabilizer polymer, wherein the cationic dispersion polymer has a cationic charge of from about 10 mole percent to about 80 mole percent and an RSV of from about 0.2 dl/g to about 6 dl/g.

The cationic dispersion polymers of this invention have superior performance than conventional coagulants in a dual polymer retention and drainage program. The use of these polymers also avoids the unwanted addition of oils and surfactants contained in conventional latex polymers to the process water. Additionally, these polymers require no inverter system and can be introduced to the process stream using simple feeding equipment.

DETAILED DESCRIPTION OF THE INVENTION

Definitions of Terms

As used herein, the following abbreviations and terms shall have the following meanings: AcAm for acrylamide; DMAEA.BCQ for dimethylaminoethylacrylate benzyl chloride quaternary salt; DMAEA.MCQ for dimethylaminoethylacrylate methyl chloride quaternary salt; EPI-DMA for epichlorohydrin-dimethylamine; and DADMAC for diallyldimethylammonium chloride.

"(Meth)acrylate" means acrylate or methacrylate.

"(Meth)acrylamide" means acrylamide or methacrylamide.

"Papermaking process" means a method of making paper products from pulp comprising forming an aqueous cellulosic papermaking slurry, draining the slurry to form a sheet and drying the sheet. The steps of forming the papermaking slurry, draining and drying may be carried out in any conventional manner generally known to those skilled in the art.

"Monomer" means a polymerizable allylic, vinylic or acrylic compound. The monomer may be anionic, cationic or nonionic. Vinyl monomers are preferred, acrylic monomers are more preferred.

"Cationic monomer" means a monomer of formula

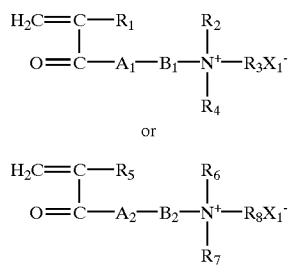

wherein $A_1$ and $A_2$ are independently O or NH; $B_1$ and $B_2$ are independently $C_2$–$C_4$ alkylene or hydroxypropylene; $R_1$ and $R_5$ are independently H or $CH_3$, $R_2$, R4, R6 and $R_7$ are independently $C_1$–$C_2$ alkyl; $R_3$ is H or $C_1$–$C_2$ alkyl; $R_8$ is $C_4$–$C_{20}$ alkyl or arylalkyl; and $X_1$ and $X_2$ are anionic counterions. Representative cationic monomers include dimethylaminoethylmethacrylate benzyl chloride salt (DMAEM.BCQ), dimethylaminoethylacrylate benzyl chloride salt (DMAEA.BCQ ), dimethylaminoethylacrylate methyl chloride salt (DMAEA.MCQ ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyltrimethylammonium chloride (MAPTAC), acrylamidopropyltrimethylammonium chloride (APTAC), and the like. Dimethylaminoethylacrylate methyl chloride salt and dimethylaminoethylacrylate benzyl chloride salt are preferred.

"Nonionic monomer" means a monomer as defined herein which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2-hydroxypropyl) methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acrylate, N-vinyl-2-pyrrolidone, glycerol mono((meth)acrylate), 2-hydroxyethyl(meth)acrylate, 2-hydroxypropyl(meth) acrylate, vinyl methylsulfone, vinyl acetate, glycidyl(meth) acrylate, and the like. Preferred nonionic monomers include acrylamide and methacrylamide. Acrylamide is more preferred.

"Alkyl" means a monovalent group derived from a straight or branched chain saturated hydrocarbon by the removal of a single hydrogen atom. Representative alkyl groups include methyl, ethyl, n- and iso-propyl, cetyl, and the like.

"Alkoxy" and "alkoxyl" mean an alkyl-O-group wherein alkyl is defined herein. Representative alkoxy groups include methoxyl, ethoxyl, propoxyl, butoxyl, and the like.

"Alkylene" means a divalent group derived from a straight or branched chain saturated hydrocarbon by the removal of two hydrogen atoms. Representative alkylene groups include methylene, ethylene, propylene, and the like.

"Hydroxypropylene" means a propylene group substituted with hydroxy.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylalkyl" means an aryl-alkylene-group wherein aryl and alkylene are defined herein. Representative arylalkyl include benzyl, phenylethyl, phenylpropyl, 1-naphthylmethyl, and the like. A preferred arylalkyl is benzyl.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Anionic counterion" means any organic or inorganic anion which neutralizes the positive charge on the quaternary nitrogen atom of a cationic monomer as defined herein. Representative anionic counterions include halogen, sulfate, sulfonate, phosphate, monohydrogen phosphate, nitrate, carboxylate, and the like. A preferred anionic counterion is halogen.

"Chain transfer agent" means any molecule, used in free-radical polymerization, which will react with a polymer radical forming a dead polymer and a new radical. Chain transfer agents are used herein to control the molecular weight of the cationic dispersion polymers of this invention. Representative Chain Transfer Agents are listed by K. C. Berger and G. Brandrup, "Transfer Constants to Monomer, Polymer, Catalyst, Solvent, and Additive in Free Radical Polymerization," Section II, pp. 81–151, in "Polymer Handbook, " edited by J. Brandrup and E. H. Inmergut, 3d edition, 1989, John Wiley & Sons, New York. Preferred chain transfer agents include salts such as sodium formate, sodium hypophosphite, and the like, alcohols such as methanol, ethanol, propanol, benzyl alcohol, glycerol, polyethyleneglycol, and the like and combinations thereof. Sodium formate, sodium hypophosphite and benzyl alcohol and combinations of these chain transfer agents are more preferred.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;
$\eta_o$=viscosity of solvent at the same temperature; and
c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_O$ are measured using a Cannon-Ubbelohde Semi-Micro dilution viscometer, size 75. The viscometer is mounted in a perfectly vertical position in a constant temperature bath adjusted to 30 ±0.02° C. The error inherent in the calculation of RSV is about 0.5 dl/g. For the RSV measurements reported herein, the polymer concentration used is 0.045% polymer actives dissolved in either a 1.0N or a 0.125N sodium nitrate solution.

Similar RSVs measured for two linear polymers of identical or very similar composition is one indication that the polymers have similar molecular weights, provided that the polymer samples are treated identically and that the RSVs are measured under identical conditions.

"IV" stands for intrinsic viscosity, which is RSV extrapolated to the limit of infinite dilution, infinite dilution being when the concentration of polymer is equal to zero.

"Dispersion polymer" means a water-soluble polymer dispersed in an aqueous continuous phase containing one or more inorganic/organic salts. Representative examples of dispersion polymerization of water-soluble polymers in an aqueous continuous phase are found in U.S. Pat. Nos. 4,929,655, 5,006,590, 5,597,859 and 5,597,858 and European patent nos. 630 909 and 657 478.

The cationic dispersion polymer of this invention is prepared by preparing a mixture of water, one or more polyvalent anionic salts, nonionic monomers, cationic monomers and chain transfer agents, a particle stabilizing polymer, any polymerization additives such as chelants, pH buffers and viscosity modifiers and charging the mixture to a reactor equipped with a mixer, a temperature regulating thermocouple, a nitrogen purging tube, and a water condenser.

A batch or semi-batch polymerization method can be employed to prepare the dispersion polymer of this invention. In a batch polymerization, the polymeric stabilizing polymers, chain transfer agents, monomers, chelant, and water are initially added to the reactor. All or a portion of the formulation salt/salts are also added to the reactor at this time. Mechanical agitation is started and the reactor contents are heated to the desired polymerization temperature. When the reaction temperature is reached, the initiator is added and a nitrogen purge is started. The reaction is allowed to proceed at the desired temperature until completion and then the contents of the reactor are cooled. Additional inorganic salts may be added during the polymerization to maintain processability or influence final product quality. Moreover, additional initiator may be added during the reaction to achieve desired conversion rates and facilitate reaction completeness. Post polymerization additives such as additional salt, water, stabilizers for molecular weight and pH and anti-foaming and biocidal agents may also be added to the reaction mixture.

Use of a semi-batch polymerization method will vary from a batch polymerization method only in that one or more of the monomers used in the synthesis of the polymer are held out in part or whole at the beginning of the reaction. The withheld monomer is then added over the course of the polymerization. If acrylamide monomer is used as a semi-batch monomer, a chelant is often also added during the semi-batch period.

Polyvalent anionic salts suitable for preparing the dispersion polymer include inorganic or organic sulfates, sulfonates, phosphates, chlorides or a mixture thereof Preferred anionic salts include ammonium sulfate, sodium sulfate, magnesium sulfate, aluminum sulfate, ammonium hydrogen phosphate, sodium hydrogen phosphate, potassium hydrogen phosphate, sodium chloride and ammonium chloride. The salts are used in aqueous solution typically having a combined total concentration of 10 weight percent or above in the product mixture.

Suitable polymeric stabilizing agents include water-soluble cationic polymers that are preferably soluble in the aqueous salt solution. The dispersant is used in an amount of from about 1 to about 10% by weight based on the total weight of the dispersion polymer.

The polymeric stabilizing agents, also referred to as stabilizers, keep the formed polymer particles from becoming agglomerated and forming a gel rather than a fine dispersion of particles. Suitable stabilizers include polyethylene glycol, polyvinylpyrrolidone, homopolymers of cationic diallyl-N, N-disubstituted ammonium monomers or N,N-disubstituted-aminoethyl(meth)acrylate monomers and their quaternary salts, copolymers of diallyl-N,N-disubstituted ammonium monomers and N,N-disubstituted-aminoethyl(meth)acrylate monomers and their quaternary salts, cationic polymers comprising 20 mole percent or more of cationic diallyl-N,N-disubstituted ammonium monomers or N,N-disubstituted-aminoethyl(meth)acrylate monomers and their quaternary salts and one or more nonionic monomers, preferably acrylamide, methacrylamide or styrene. The molecular weight of the stabilizer is preferably in the range of about 10,000 to 10,000,000. Preferred dispersants include homopolymers of diallyldimethyl ammonium chloride, dimethylaminoethylacrylate methyl chloride quaternary salt and dimethylaminoethylmethacrylate methyl chloride quaternary salt.

A multifunctional alcohol such as glycerin or polyethylene glycol may also be included in the polymerization system. Adipic acid may also be included in the polymerization system. The deposition of the fine particles is smoothly carried out in the presence of these alcohols and/or acid.

The polymerization reaction is initiated by any means that results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis(2-amidinopropane) dihydrochloride and 2,2'-azobis(N,N'-dimethyleneisobutyramidine) dihydrochloride, and the like.

A seed polymer may be added to the reaction mixture before initiating polymerization of the monomers for the purpose of obtaining a fine dispersion. The seed polymer is a water-soluble cationic polymer moderately soluble or insoluble in the aqueous solution of the polyvalent anionic salt. The monomer composition of the seed polymer need not be identical to that of the water-soluble cationic polymer formed during polymerization. The seed polymer is preferably a polymer prepared from the above monomer mixture by the process described herein.

The polymerization may also be conducted in the presence of a seed dispersion having a composition similar to the desired polymer dispersion.

Since the dispersion polymers do not contain surfactants or oil, the dispersion polymers are environmentally friendly. Moreover, the absence of oil in the dispersion polymers equates to such polymers having virtually zero volatile organic content (VOC), which is another environmental advantage of such polymers. The use of dispersion polymers also minimizes the inhalation hazards generally associated with the use of dry polymers.

Preferred Embodiments

The low molecular weight water-soluble cationic dispersion polymer is prepared by polymerizing a) one or more cationic monomers of formula

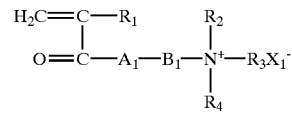

wherein $A_1$ is O or NH; $B_1$ is $C_2$–$C_4$ alkylene or hydroxypropylene; $R_1$ is H or $CH_3$, $R_2$ and R4 are independently $C_1$–$C_2$ alkyl; $R_3$ is H or $C_1$–$C_2$ alkyl; and $X_1$ is an anionic counterion;

b) one or more cationic monomers of formula

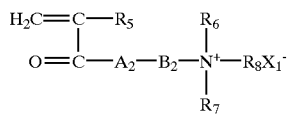

wherein $A_2$ is O or NH; $B_2$ is $C_2$–$C_4$ alkylene or hydroxypropylene; $R_5$ is H or $CH_3$, R6 independently $C_1$–$C_2$ alkyl; $R_8$ is $C_4$–$C_{20}$ alkyl or arylalkyl; and $X_2$ is an anionic counterion;

c) one or more nonionic monomers; and d) one or more chain transfer agents, under free radical forming conditions in an aqueous solution of an anionic salt in the presence of a stabilizer polymer.

In a preferred aspect of this invention, the nonionic monomers are selected from acrylamide and methacrylamide.

In another preferred aspect, $R_3$ is $C_1$–$C_2$ alkyl and $R_8$ is arylalkyl.

In another preferred aspect, the cationic monomers are selected from dimethylaminoethyl(meth)acrylate methyl chloride salt and dimethylaminoethyl(meth)acrylate benzyl chloride salt.

In another preferred aspect, the low molecular weight water-soluble cationic dispersion polymer has a cationic charge of from about 35 mole percent to about 80 mole percent.

In another preferred aspect, the low molecular weight water-soluble cationic dispersion polymer contains at least 15 mole percent dimethylaminoethyl(meth)acrylate benzyl chloride salt.

In another preferred aspect, the low molecular weight water-soluble cationic dispersion polymer has a cationic charge of about 35 mole percent.

In another preferred aspect, the low molecular weight water-soluble cationic dispersion polymer has a RSV of from about 1.5 dl/g to about 2.5 dl/g.

The effective amount of the low molecular weight water-soluble cationic dispersion polymer depends on the characteristics of the particular papermaking furnish and can be readily determined by one of ordinary skill in the papermaking art. Typical dosages are from about 0.01 to about 6, preferably from about 0.1 to about 4 and more preferably from about 0.1 to about 2 pounds polymer actives/ton solids in the furnish.

The low molecular weight water-soluble cationic dispersion polymer of this invention is used in combination with one or more flocculants. The flocculant is added to the papermnaking furnish to assist in the agglomeration of small particles and thereby increase the retention and drainage properties of the furnish.

The flocculent may be a non-ionic, anionic, cationic or zwitterionic polymer having a molecular weight of at least about 500,000, preferably of at least about 1,000,000 and more preferably of at least about 5,000,000. The flocculant may also be a structurally modified cationic, anionic or nonionic polymer as described in co-pending U.S. patent application Ser. No. 25 09/606,581, filed Jun. 29, 2000, incorporated herein by reference. The flocculant may be used in the solid form, as an aqueous solution, as water-in-oil emulsion, or as dispersion in water. The dosage of flocculant is preferably from about 0.001 to about 0.5 percent, more preferably from about 0.02 to about 0.25 percent % (as actives) by weight based on total solids in the slurry.

"Nonionic flocculant" means homopolymers, copolymers or terpolymers and so on of nonionic monomers. Representative nonionic monomers include acrylamide, methacrylamide, N-methylacrylamide, N,N-dimethyl(meth)acryamide, N,N-diethyl(meth)acrylamide, N-isopropyl(meth)acrylamide, N-tertiary butyl acrylamide, N-vinylformamide, N-vinypyrrolidone, N-vinylpiperidone, N-vinylcaprolactam, N-vinyl-3-methylpyrrolidone, N-vinyl-5-methylpyrrolidone, N-vinyl-5-phenylpyrrolidone, N-vinyl-2-oxazolidone, N-vinylimidazole, vinylacetate, maleimide, N-vinylmorpholinone, polyethylene oxide (PEO), and the like. Preferred nonionic monomers are acrylamide, methacrylamide and N-vinylformamide. Preferred nonionic flocculants are poly(acrylamide), poly(methacrylamide) and partially or completely hydrolyzed poly(N-vinylformamide).

"Cationic flocculant" means any water-soluble polymer of (meth)acrylamide or any water-soluble polymer of N-vinylformamide or related monomers which carries or is capable of carrying a cationic charge when dissolved in water. Representative cationic copolymers of (meth)acrylamide include copolymers of (meth)acrylamide with dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate, methyl chloride or benzyl chloride, Mannich reaction modified polyacrylamides, diallylcyclohexylamine hydrochloride (DACHA/HCl), diallyldimethylammonium chloride (DADMAC), methacrylamidopropyltrimethylammonium chloride (MAPTAC) and allyl amine (ALA).

"Anionic flocculant" means any polymer comprised of anionic and nonionic monomers which carries or is capable of carrying an anionic charge when dissolved in water. Representative anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide, acrylamido glycolic acid, and the water-soluble alkali metal, alkaline earth metal, and ammonium salts thereof. The choice of anionic monomer is based upon several factors including the ability of the monomer to polymerize with the desired comonomer, the use of the produced polymer, and cost. A preferred anionic monomer is acrylic acid. Preferred anionic flocculants are copolymers of acrylamide and acrylic acid.

"Zwitterionic flocculent" means a polymer composed from zwitterionic monomers and, possibly, other non-ionic monomer(s). Representative zwitterionic polymers include homopolymers such as the homopolymer of N. N-dimethyl-N-(2-acryloyloxyethyl)-N-(3-sulfopropyl) ammonium betaine, copolymers such as the copolymer of acrylamide and N,N-dimethyl-N-(2-acryloyloxyethyl)-N-(3-sulfopropyl) ammonium betaine, and terpolymers such as the terpolymer of acrylamide, N-vinyl-2-pyrrolidone, and 1-(3-sulfopropyl)-2-vinylpyridinium betaine. The use of zwitterionic flocculants in papermaking is described in U.S. Pat. No. 6,313,246, incorporated herein by reference.

The order and method of addition of the low molecular weight water-soluble cationic dispersion polymer of this invention and the flocculent can be empirically determined by one of ordinary skill in the papermaking art. However, the following are preferred.

The low molecular weight water-soluble cationic dispersion polymer and flocculent are dosed separately to the thin stock with the low molecular weight water-soluble cationic dispersion polymer added first followed by the flocculant.

In another preferred method of addition the low molecular weight water-soluble cationic dispersion polymer is added to tray water, e.g. the suction side of the fan pump prior to thick stock addition, and the flocculant to the thin stock line.

In another preferred method of addition the low molecular weight water-soluble cationic dispersion polymer is added to thick stock, e.g. stuff box, machine chest or blend chest, followed by addition of the flocculant in the thin stock line.

In another preferred method of addition the low molecular weight water-soluble cationic dispersion polymer and the flocculant are fed simultaneously to the thin stock like a single polymer program.

The retention and drainage properties of the furnish may also be improved by addition of a microparticle. For example, U.S. Pat. Nos. 4,753,710, 4,913,775, 5,393,381 and 6,007,679 incorporated herein by reference, describe the use of cationic polymers and microparticles in a papermaking process.

"Microparticles" means highly charged materials that improve flocculation when used together with natural and synthetic macromolecules. Microparticles are used in combination with other wet end additives to improve retention and drainage on the paper machine. Microparticles encompass a broad set of chemistries including polysilicate microgel, structured colloidal silicas, colloidal alumina, polymers including copolymers of acrylic acid and acrylamide and naphthalene sulfonate/formaldehyde condensate polymers, bentonite and mineral clays such as montmorillonite, saponite and smectite types and colloidal silica in its many forms including modified colloidal silicic acids such as those described in PCT/US98/19339.

Representative copolymers of acrylic acid and acrylamide useful as microparticles include Nalco® 8677 PLUS, available from ONDEO Nalco Company, Naperville, Ill., USA. Other copolymers of acrylic acid and acrylamide are described in U.S. Pat. No. 5,098,520, incorporated herein by reference.

"Bentonites" include any of the materials commercially referred to as bentonites or as bentonite-type clays, i.e., anionic swelling clays such as sepialite, attapulgite and montmorillonite.

In addition, the bentonites described in U.S. Pat. No. 4,305,781 are suitable. A preferred bentonite is a hydrated suspension of powdered bentonite in water. Powdered bentonite is available as Nalbrite™, from ONDEO Nalco Company.

Representative dispersed silicas have an average particle size of from about 1 to about 100 nanometers (nm), preferably from about 2 to about 25 nm, and more preferably from about 2 to about 15 nm. This dispersed silica may be in the form of colloidal silicic acid, silica sols, fumed silica, agglomerated silicic acid, silica gels, precipitated silicas, and all materials described in Patent Cooperation Treaty Patent Application No. PCT/US98/19339, so long as the particle size or ultimate particle size is within the above ranges. Dispersed colloidal silica in water with a typical particle size of 4 nm is available as Nalco®8671, from ONDEO Nalco Company. Another type of inorganic colloid used as a microparticle is a borosilicate in water; available as Nalco® 8692, from ONDEO Nalco Company. Other types of colloidal silica and modified colloidal silicas are commercially available from E.I. du Pont de Nemours and Co., Wilmington, Del. under the tradename Ludox®, from Akzo Nobel, Surte, Sweden (BMA or NP Series), from Vinings Industries Inc., Atlanta, Ga. and from Nissan Chemical Industries, Ltd., Tokyo, Japan.

Representative naphthalene sulfonate/formaldehyde condensate polymers include Nalco® 8678 from ONDEO Nalco Company.

The amount of microparticle added to the papermaking furnish is from about 0.025 to about 5, preferably from about 0.05 to about 4 and more preferably about 0.1 to about 3 kilograms microparticle/tonne.

"Kilograms microparticle/tonne" means kilograms of actual microparticle per 1000 kilograms of solids present in the furnish. The abbreviation for kilograms of actual microparticle per 1000 kilograms of solids present in the furnish is "kg microparticle/tonne".

The microparticle is added to the papermaking furnish either before or after the polymers are added to the furnish. The choice of whether to add the microparticle before or after the polymers can be made by a person of ordinary skill in the art based on the requirements and specifications of the papermaking furnish.

The foregoing may be better understood by reference to the following Examples, which are presented for illustration and are not intended to limit the scope of the invention.

EXAMPLE 1

A 20.4% polymer solids, 65/15/20 mole percent acrylamide/dimethylaminoethylacrylate benzyl chloride quaterriary salt/dimethylaminoethylacrylate methyl chloride quaternary salt dispersion terpolymer is prepared as follows.

A 1.5 liter reaction flask is fitted with a mechanical stirrer, thermocouple, condenser, nitrogen purge tube, an addition port and heating tape. To this reaction flask are added 153.0 g of acrylamide (48.6% aqueous solution, ONDEO Nalco Company, Naperville, Ill.), 81.8 g of dimethylaminoethylacrylate benzyl chloride quaternary salt (71.5% aqueous solution, ONDEO Nalco Company, Naperville, Ill.), 70.4 g dimethylaminoethylacrylate methyl chloride quaternary salt (79.5% aqueous solution, CPS Chemical Company, Old Bridge, N.Y.), 36.4 g of a homopolymner of dimethylaminoethylacrylate methyl chloride quaternary salt (15% aqueous solution, ONDEO Nalco Company, Naperville, Ill.), 55.4 g of a homopolymer of diallyldimethylammonium chloride (12% aqueous solution, ONDEO Nalco Company, Naperville, Ill.), 1.0 g of sodium formate, 0.2 g of ethylenediaminetetraacetic acid, tetra sodium salt (Dow Chemical Co., Midland, Mich.), 160.0 g of ammonium sulfate, 15.0 g sodium sulfate and 352.0 g of deionized water. The mixture is heated to 47° C. while stirring at 900 rpm. After reaching 47° C., 1.5 g of a 1.0% aqueous solution of 2,2'azobis(2-amidinopropane) dihydrochloride (Wako VA-50, Wako Chemicals, Dallas, Tex.) is added to the reaction mixture and a constant purge of nitrogen is started. After two hours, 9.1 g of dimethylaminoethylacrylate benzyl chloride quaternary salt (71.5% aqueous solution), 7.8 g dimethylaminoethylacrylate methyl chloride quaternary salt (79.5% aqueous solution) and 3.0 g of a 1% aqueous solution of 2,2'-azobis(2-amidinopropane) dihydrochloride are added in sequence, in one shot portions. After an additional three hours, 4.0 g of a 10% aqueous solution of 2,2'-azobis(2-amidinopropane) dihydrochloride is added and the reaction temperature is raised to 55° C. After two hours at 55° C. the reaction is cooled, and 10.0 g acetic acid and 20.0 g ammonium chloride are added.

The final product is a smooth milky white dispersion with a bulk viscosity of 130 cp and a reduced specific viscosity of 9.8 dl/g, measured for a 0.045% solution of the polymer in 0.125N aqueous sodium nitrate at 30° C.

EXAMPLE 2

A 20.6% polymer solids, 65/15/20 mole percent acrylamide/dimethylaminoethylacrylate benzyl chloride quaternary salt/dimethylaminoethylacrylate methyl chloride quaternary salt dispersion terpolymer is prepared as follows:

To the reactor described in Example 1 are added 150.5 g of acrylamide (49.4% aqueous solution), 81.9 g of dimethylaminoethylacrylate benzyl chloride quaternary salt (71.5% aqueous solution), 70.4 g dimethylaminoethylacrylate methyl chloride quaternary salt (79.5% aqueous solution), 32.0 g of a homopolymer of dimethylaminoethylacrylate methyl chloride quaternary (15% aqueous solution), 48.0 g of a homopolymer of diallyldimethylammonium chloride (15% aqueous solution, ONDEO Nalco Company, Naperville, Ill.), 0.1 g of sodium formate, 2.0 g of benzyl alcohol, 0.2 g of ethylenediaminetetraacetic acid, tetra sodium salt, 155.0 g of ammonium sulfate, 15.0 g sodium sulfate and 368.0 g of deionized water. The mixture is heated to 47° C. while stirring at 900 rpm. After reaching 47° C., 1.5 g of a 1.0% aqueous solution of 2,2'-azobis(2-amidinopropane) dihydrochloride is added to the reaction mixture and a constant purge of nitrogen is started. After two hours, 4.6 g of dimethylaminoethylacrylate benzyl chloride quaternary salt (71.5% aqueous solution) and 4.0 g dimethylaminoethylacrylate methyl chloride quaternary salt (79.5% aqueous solution) are added in sequence, in one shot portions. After an additional hour, a second, equal monomer addition is made as before (4.6 g of dimethylaminoethylacrylate benzyl chloride quaternary salt (71.5% aqueous solution) and 4.0 g dimethylaminoethylacrylate methyl chloride quaternary salt (79.5% aqueous solution)), followed by addition of 3.0 g of a 1% aqueous solution of 2,2'-azobis(2-5 amidinopropane) dihydrochloride. After an additional three hours, 4.0 g of a 10% aqueous solution of 2,2'-azobis(2-amidinopropane) dihydrochloride is added and the reaction temperature is raised to 55° C. After 1.5 hours at 55° C. the reaction is cooled, and 10.0 g acetic acid and 10.0 g ammonium chloride are added.

The final product is a foamy, milky white dispersion with a bulk viscosity of 360 cp and a reduced specific viscosity of 5.2 dt/g, measured for a 0.045% solution of the polymer in 0.125N aqueous sodium nitrate at 30° C.

Various levels and/or combinations of sodium formate and benzyl alcohol are used to modify polymer molecular weight. Examples of some of the tested combinations and their effect on molecular weight are listed Table 1.

TABLE 1

Effect of Chain Transfer Agent on Molecular Weight

| Grams of sodium formate in approximately 1 kg reaction | Grams of benzyl alcohol in approximately 1 kg reaction | RSV (dl/g) (0.125 N NaNO$_3$) |
| --- | --- | --- |
| 0.5 | 0 | 13.2 |
| 1.0 | 0 | 9.8 |
| 5.0 | 0 | 2.5 |
| 0.1 | 2.0 | 5.2 |
| 6.0 | 2.0 | 1.5 |
| 5.0 | 2.0 | 1.6 |

The experimental polymer products tested in Example 3 are listed in Table 2. Polymers A and B are representative high molecular weight AcAm/DMAEA.MCQ/DMAEA.BCQ dispersion polymers available from Nalco Chemical Company. Polymers C-J are low molecular weight AcAm/DMAEA.MCQ/DMAEA.BCQ dispersion polymers prepared according to Examples 1 and 2. Polymer K is a representative commercially available, high-charge solution polymer coagulant.

TABLE 2

| Polymer Number | Cationic Charge (Mole %) | RSV (dl/g) | Product Type (Form) | Cationic Chemistry Type |
| --- | --- | --- | --- | --- |
| A | 35 | 20 | Dispersion | DMAEA/MCQ/BCQ |
| B | 35 | 15.3 | Dispersion | DMAEA/MCQ/BCQ |
| C | 35 | 9.8 | Dispersion | DMAEA/MCQ/BCQ |
| D | 35 | 5.2 | Dispersion | DMAEA/MCQ/BCQ |
| E | 35 | 2.5 | Dispersion | DMAEA/MCQ/BCQ |
| F | 35 | 1.5 | Dispersion | DMAEA/MCQ/BCQ |
| G | 35 | 0.5 | Dispersion | DMAEA/MCQ/BCQ |
| H | 50 | 0.4 | Dispersion | DMAEA/MCQ/BCQ |
| I | 80 | 3.9 | Dispersion | DMAEA/MCQ/BCQ |
| J | 80 | 0.6 | Dispersion | DMAEA/MCQ/BCQ |
| K | 100 | 0.2 | Solution | DADMAC |

EXAMPLE 3

The effectiveness of the low molecular weight water-soluble cationic dispersion of this invention as a retention and drainage aid is shown in this example. Testing is performed by adding 2.5 ppm of the low molecular weight polymer into 500 ml of paper furnish and mixing by pouring the mixture from beaker to beaker. Five beaker to beaker pours are used and then a cationic flocculant (90:10 mole % acrylamide/dimethylaminoethylacrylate methyl chloride quaternary salt cationic emulsion polymer having a RSV range of 15 to 21 dl/g, available from ONDEO Nalco Company, Naperville, Ill.) at 10 ppm is added and the mixture is mixed for an additional 7 beaker to beaker pours. The mixture is then poured onto a retention wire and the turbidity of the filtrate is measured. The results presented in Table 3 clearly show the lower RSV (molecular weight) polymers have more activity in reducing filtrate turbidity than the high molecular weight polymers and the K standard coagulant chemistry.

TABLE 3

Paper Mill 1: Retention and Drainage Testing
Measured Water Turbidity (NTU) at 2.5 ppm Dosage

| Polymer Number | RSV (dl/g) | Turbidity (NTU) |
| --- | --- | --- |
| No Polymer | | 750 |
| A | 25 | 151 |
| B | 20 | 138 |
| C | 9.8 | 101 |
| D | 5.2 | 131 |
| E | 2.5 | 80 |
| F | 1.5 | 76 |
| K | 0.2 | 273 |

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A method for improving retention and drainage performance in a papermaking process comprising adding to a papermaking slurry an effective amount of one or more flocculants and an effective amount of one or more low molecular weight water-soluble cationic dispersion terpolymers, wherein the low molecular weight cationic dispersion terpolymer is prepared by polymerizing dimethylaminoethyl(meth)acrylate methyl chloride salt, dimethylaminoethyl(meth)acrylate benzyl chloride salt, one or more nonionic monomers selected from the group consisting of acrylamide and methacrylamide, and one or more chain transfer agents, under free radical forming conditions in an aqueous solution of an anionic salt in the presence of a stabilizer polymer, wherein the cationic dispersion polymer has a cationic charge of from about 35 mole percent to about 80 mole percent, an RSV of from about 1.5 dl/g to about 2.5 dlg and contains at least about 15 mole percent dimethylaminoethyl(meth)acrylate benzyl chloride salt.

2. The method of claim 1 wherein the nonionic monomer is acrylamide.

3. The method of claim 1 wherein the low molecular weight low molecular weight water-soluble cationic dispersion terpolymer has a cationic charge of about 35 mole percent.

4. The method of claim 1 further comprising adding a microparticle to the papermaking slurry, wherein said microparticle is selected from the group consisting of an inorganic colloid of borosilicate in water, colloidal silica, colloidal alumina, copolymers of acrylic acid and acrylamide, naphthalene sulfonate/formaldehyde condensate polymers, bentonite, montmorillonite, saponite, smectite, sepialite and attapulgite.

5. The method of claim 4 wherein said microparticle is an inorganic colloid of borosilicate in water.

* * * * *